(12) United States Patent
Clark

(10) Patent No.: US 7,845,091 B2
(45) Date of Patent: Dec. 7, 2010

(54) BRAKE PAD MEASURING TOOL AND METHOD OF USING THE SAME

(76) Inventor: Charles L. Clark, 255 E. Bradley #58, El Cajon, CA (US) 92021

( * ) Notice: Subject to any disclaimer, the term of this patent is extended or adjusted under 35 U.S.C. 154(b) by 125 days.

(21) Appl. No.: 12/334,451

(22) Filed: Dec. 13, 2008

(65) Prior Publication Data
US 2010/0031523 A1 Feb. 11, 2010

Related U.S. Application Data

(63) Continuation-in-part of application No. 12/187,657, filed on Aug. 7, 2008, now abandoned.

(51) Int. Cl.
*G01B 3/20* (2006.01)
*G01B 5/06* (2006.01)
*G01B 5/14* (2006.01)

(52) U.S. Cl. .......................... 33/609; 33/806

(58) Field of Classification Search .............. 33/501.08, 33/501.09, 501.45, 542, 560, 609, 610, 783, 33/794, 802, 806, 809, 810, 811, 812, 827, 33/832, 833, 834, 836
See application file for complete search history.

(56) References Cited

U.S. PATENT DOCUMENTS

| | | | | |
|---|---|---|---|---|
| 890,590 | A | | 6/1908 | Anderson |
| 1,243,545 | A | | 10/1917 | Nefedov |
| 2,643,459 | A | * | 6/1953 | Beers et al. ............ 33/560 |
| 2,650,435 | A | * | 9/1953 | Kidd .................... 33/836 |
| 2,849,801 | A | * | 9/1958 | Kustusch ............... 33/542 |
| 3,016,619 | A | * | 1/1962 | Mueller ................. 33/836 |
| 3,101,551 | A | | 8/1963 | Bryant |
| 3,660,905 | A | | 5/1972 | McFarland |
| 3,716,922 | A | * | 2/1973 | Shaver .................. 33/607 |
| D229,222 | S | | 11/1973 | Paulk |
| 3,921,302 | A | * | 11/1975 | Wilkerson .............. 33/609 |
| 4,033,043 | A | * | 7/1977 | Cunningham ............ 33/806 |
| 4,165,566 | A | | 8/1979 | Lycan |
| 4,420,455 | A | | 12/1983 | Qurnell |
| 4,497,115 | A | * | 2/1985 | Dearman ................ 33/529 |
| 4,892,449 | A | * | 1/1990 | Croxton ................. 411/54 |
| 5,095,638 | A | * | 3/1992 | David et al. ............ 33/783 |
| 5,390,427 | A | * | 2/1995 | Heller et al. ............ 33/811 |
| 5,497,560 | A | * | 3/1996 | Pasquerella et al. ...... 33/836 |

(Continued)

*Primary Examiner*—R. A. Smith
(74) *Attorney, Agent, or Firm*—Marcus C. Dawes; Daniel L. Dawes (57) ABSTRACT

A brake pad measuring device is designed to be small enough to fit through various suspension components or many vehicles' wheel aperture and still maintain the ability to move in three-dimensions. The device is compact enough so that it may take an accurate reading of the thickness of a brake pad while being between the caliper housing and the brake pad backing plate of a vehicle. The device also comprises a spring so that once it is correctly placed, it may be manipulated in order to automatically get a reading of the thickness of a brake pad to the closest millimeter or $32^{nd}$ of an inch by releasing the spring to cause a measurement to be automatically taken. Using this device, any user can get quick, reliable measurements for all four sets of brake pads in a matter of minutes and all without having to remove a single wheel from the vehicle.

19 Claims, 3 Drawing Sheets

U.S. PATENT DOCUMENTS

| | | |
|---|---|---|
| 6,237,723 B1 | 5/2001 | Salsman |
| 6,931,744 B1 | 8/2005 | Ikerd, Jr. |
| 7,040,151 B2 | 5/2006 | Graham |
| 7,066,302 B1 | 6/2006 | Talbert |
| 7,559,150 B2 * | 7/2009 | Fernandez .................. 33/512 |
| 2005/0066535 A1 * | 3/2005 | Rupp et al. .................. 33/512 |
| 2006/0283030 A1 * | 12/2006 | Lee .............................. 33/293 |

\* cited by examiner

BRAKE PAD MEASURING TOOL AND METHOD OF USING THE SAME

BACKGROUND OF THE INVENTION

1. Field of the Invention

The invention relates to the field of measuring the diagnostics of automobiles, specifically the measurement of disc brake pads.

2. Description of the Prior Art

Traditionally, when the thickness of the lining material on disc brake pads is measured, the entire wheel must be removed from the vehicle. Once the wheel has been physically removed, a thickness or feeler gauge is selected from a collection of thickness gauges that range over ten to twelve different sizes. The selected gauge is then inserted down through the center of the caliper between the backing plate of the brake pad and the machined surface of the rotor. This traditional method of measuring brake pad thickness can take 5-15 minutes per wheel and can be quite physically demanding due to the size and weight of the tires of many current vehicles. Brake inspections have become routine in many high-end service centers, adding to costs and time to service the vehicles.

What is needed is a measuring device to quickly and accurately measure a small distance within a tight area such as in the wheel well of a vehicle without the necessity of taking off the wheel.

Several examples found in the prior art have attempted to solve this problem in one way or another, but unfortunately they also contain several limitations and drawbacks that make them unsuitable or undesirable for the purpose of the current invention. For example, many devices found in the prior art are capable of measuring very small gaps or slots. However, most of these prior art devices are placed at one edge of a gap to be measured and are then manipulated by the user to extend the distal tip or an inner rod until it telescopes to the other end of the gap. Once the distal end has reached the far side of the area to be measured, the user must then tighten or lock down the measuring portion of the device so that a measurement may be read from the device. These devices are also often bulky, clumsy and difficult to operate as they sometimes require two manipulations to get an effective and accurate reading. Additionally, some of these devices are too big to be manipulated in small areas such as the space behind or through a wheel opening and therefore still require the wheel to be removed each time the brake pads are measured.

Other prior art devices for measuring small gaps, specifically those between the rotor surface and the backing plate of the brake pad, involve the use of a device which is permanently and physically coupled to the vehicle. This solution is extremely limited and usually used only on large trucks and other specially designed vehicles that have the necessary interior space available to accommodate such an option. Most passenger vehicles on the road today would not therefore be able to accommodate such a device.

What is needed is a brake pad measuring tool that is small, compact, quick, and easy to use and if possible, does not require the removal of any wheels from the vehicle and does not require permanent coupling to the vehicle.

BRIEF SUMMARY OF THE INVENTION

The illustrated embodiment of the invention solves this and other problems by being small enough to fit through most any wheel aperture and still move in three-dimensions. The device is also compact enough so that it may take an accurate reading of the thickness of a brake pad while still being between the caliper housing and the brake pad backing plate. The device of the illustrated embodiment also comprises a spring so that once it is correctly placed, it may be manipulated in order to automatically get a reading of the thickness of a brake pad to the closest millimeter or $32^{nd}$ of an inch upon release of a spring action. Using this device, any user can get quick, reliable and accurate measurements at all four brake caliper assemblies in a matter of a few minutes, e.g. normally less than 5 minutes, and all without having to remove any wheel from the vehicle.

The invention comprises a steel grade alloy, hollow cylindrical housing that is approximately 12 cm long and sufficiently small in diameter to fit through most apertures located in or behind the wheel of a vehicle. The dimensions of the device are similar to that of a ball point pen. Inside of the hollow housing is a movable 14 gauge rod or probe with a J-shaped distal tip that is telescopically disposed through the housing, a measuring barrel, a rotatable finger grip and is threaded into a calibration nipple at the proximal end of the device. Also inside of the housing is a compression spring that is compressed between a washer and the hollow hexagonal measuring barrel. The probe is telescopically disposed through the entirety of the longitudinal length of the device, namely from the distal tip of the device through the center of the spring, through the steel spacer, through the measuring barrel and then terminating in the calibration nipple. The probe lies in a position that is slightly off center from the longitudinal axis of symmetry of the device for reasons described below.

The distal tip of the housing has a semi-circular opening, which is longitudinally cut away from the tip of the housing for a predetermined length. Thus the housing is a half cylinder or less for approximately 30 mm up along the length of the housing to provide an opening large enough out of which the probe is rotated and provides enough length and radial swing in a plane perpendicular to the longitudinal axis of the hollow cylindrical housing for the probe to make a brake pad thickness measurement that is up to 20 mm thick without the housing impeding the manipulation of the J-tip end of the probe. In the distal end of the housing are two notches specifically sized for the J-tip as temporary catch for the probe, thereby retaining it in a pre-measurement configuration. This notch allows the J-shaped neck of the probe to firmly rest in a stationary place when the device is not in use.

Briefly, the distal tip of the device is inserted into the space between the caliper housing and the backing plate of a brake pad on a vehicle. Most measurements are taken from the inner side of the caliper with the vehicle raised. This is due to the fact that the inner pad usually receives most wear. However, the device can be inserted through a wheel opening to measure the outer pad if desired. At this point, the distal tip of the housing is flat against the rotor. The distal end of the probe clears the rotor by 2 mm to allow a slight insertion when rotating out of the reset-point notch. The finger grip is then rotated which in turn rotates the probe via the threaded calibration nipple. Once the J-shaped neck of the probe has cleared the housing through the small open notch defined in the semi-circular distal end of the housing, the internal tension spring is free to expand and pushes against the spacer element and the hexagonal measuring barrel. The spring seats in the housing of the device and forces the spacer and measuring barrel proximally toward the user. The measuring barrel in turn pushes against the finger grip which contains the threaded calibration nipple coupled to the distal end of the probe which then pulls the probe from its original position back up into the housing. As the spring continues to expand, the measuring barrel, calibration barrel, and probe all continue to move proximally as a unit until the tip of the J-shaped probe is stopped by another outside object, namely the backing plate of the brake pad. The J-tip of the probe has a flat face to provide more surface area for gripping or contacting the backing plate of the brake pad.

When the flat face of the J-tip of the probe has made firm contact with the backing plate of the brake pad, all proximal motion of the various components of the device stops, including that the measuring barrel, and are maintained in their proximal most position. It is in this state that the brake pad thickness may be determined from the device because the displacement of the measuring barrel from its original position corresponds to the distance that the probe has traveled, namely from the surface of the rotor to the surface of the backing plate. It is this distance between these two points therefore that represents the thickness of the brake pad.

After the user has noted the reading on the measuring barrel, the user manually forces the calibration barrel back down into the housing which in turn pushes the measuring barrel and compresses the tension spring back into its original compressed configuration. Once the probe has been pushed back to the distal tip of the device's housing, it may be let go to retake the current brake pad's measurement, or it may be rotated back into the notch located on the side of the semicircular distal end of the housing. The probe is kept firmly in its notch due to the spring force pulling the probe back toward the proximal end of the housing. After the probe has been properly retained in the notch in the housing, the user may take the device out of the brake caliper assembly and move on to the next brake pad to be measured and repeat the process again as many times as needed.

The illustrated embodiment of the invention includes an apparatus for measuring the thickness of a disc brake pad installed on a vehicle without requiring removal of a corresponding wheel comprising a housing having a distal end which is sized and shaped to extend through suspension components or an opening defined through the corresponding wheel for positioning relative to a brake rotor disc corresponding to the disc brake pad; a probe telescopically disposed in the housing, the probe being arranged and configured to contact a backing plate corresponding to the brake pad; a calibration barrel coupled to the probe; a spring coupled to the probe for urging the probe proximally against the backing plate when taking a measurement of the thickness of a disc brake pad; and a measuring barrel coupled to the probe so that when a measurement is made the measuring barrel is moved a distance equal to proximal movement of the probe relative to the distal end of the housing.

The probe has a J-tip shaped distal end and where the housing further comprises a distal, longitudinally cut-away portion to allow disposition and movement of the J-tip shaped distal end of the probe into and through a space defined by the distal, longitudinally cut-away portion of the housing.

The distal end of the housing further comprises a notch in which the probe may be positioned in a premeasurement configuration.

The probe further comprises a J-shaped bend in the distal end of the probe.

The probe further comprises a flattened shaped tip to provide a gripping or contact surface area.

The measuring barrel is provided with a plurality of measurement scales, is telescopically disposed in the housing and is hexagonal in shape for easy rotation for viewing the plurality of scales.

The measuring barrel is provided with a plurality of measurement scales, is telescopically disposed in the housing and is cylindrical in shape for easy rotation in the housing and for easy rotation for viewing the plurality of scales.

The calibration barrel further comprises a captured calibrating nipple threadably coupled to the probe for calibrating an initial configuration of the probe.

The probe telescopically and longitudinally extends through the housing and measuring barrel, where the measuring barrel is telescopically disposed in the housing, where the spring urges the measuring barrel with the probe proximally with respect to the housing.

The apparatus comprises a releasable locking mechanism for retaining the probe in a distally extended configuration when in a premeasurement configuration, the probe automatically assuming a measuring configuration wherein the probe contacts the backing plate due to the spring when released by the locking mechanism so that the measuring barrel is moved a distance equal to proximal movement of the probe to contact the backing plate.

The probe has a radially extending tip, where the housing has a longitudinal center axis, and where the probe is positioned off-center in the distal end of the housing with respect to the longitudinal center axis so that the shape of the distal end of the housing may arranged and configured to reduce its size as compared to a configuration of the housing with the probe on-center, but without requiring reduction in the radial extent of the tip of the probe.

The illustrated embodiment of the invention also includes a method of measuring the thickness of a disc brake pad of a vehicle without requiring removal of a corresponding wheel comprising the steps of providing a distal end of a measuring apparatus, which distal end is sized and shaped to extend through suspension components or an opening defined through the corresponding wheel; placing a distal end of a measurement apparatus against a corresponding brake rotor of a vehicle; releasing a probe from the distal end of the apparatus; moving the probe proximally until it comes into contact with a corresponding backing plate of the brake pad; moving a measuring barrel proximally approximately the same distance as the probe moved; and reading a distance measurement of the movement of the measuring barrel.

The step of releasing the probe further comprises the step of rotating a proximal finger grip coupled to the probe to rotate the probe into a measurement configuration adapted to contact the corresponding backing plate.

The step of moving the probe proximally until it comes into contact with the corresponding backing plate of the brake pad comprises the step of automatically moving the probe under a spring force upon release from the distal end of the apparatus.

The step of releasing the probe comprises the step of rotating the probe out of a notch defined in the distal end of the apparatus.

The step of moving the probe proximally comprises the step of moving the probe through a longitudinal cut-away opening in the distal end of the apparatus and positioning the backing plate into the longitudinal cut-away opening so that the probe contacts the backing plate as a first obstructing contact.

The step of moving the measuring barrel proximally out of the apparatus comprises the step of automatically moving the measuring barrel with the probe by means of spring force upon release of the probe.

The method further comprises the step of calibrating the measurement of movement of the probe by adjusting the length of the probe relative to the measuring barrel.

The step of reading a distance measurement off of the measuring barrel further comprises rotating the measuring barrel to view one of a plurality of measurement scales.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
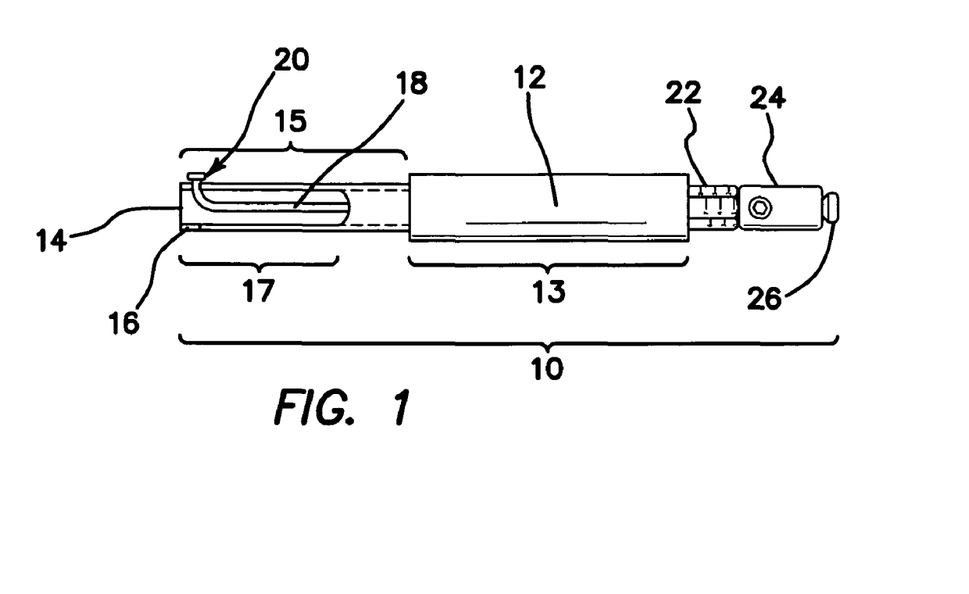
FIG. 1 is a plan view of the brake pad measuring device showing the J-tipped probe lying in open cutaway distal portion of the housing and retained in the distal end notch.

The brake pad measuring device 10 can best be seen in its assembled configuration in FIG. 1. As seen in FIG. 1, the device 10 is approximately 12 cm long and 11 mm wide at its largest point, or roughly the size of a large ball point pen, although it is to be expressly understood that the specific dimensions as well are their ratios can be freely chosen in a manner consistent with the teachings of the illustrated embodiment below.

The device 10 comprises a hollow cylindrical housing 12. The housing 12 is cylindrical in shape and is made of a light weight, strong material such as a metal alloy although other shapes and materials may be used without departing from the original spirit and scope of the invention. The outside of the housing may be provided with various finishes, such as a knurled finish on its proximal portion 13 to facilitate gripping. The distal portion 15 of the housing 12 is tapered to a smaller diameter than the proximal portion 13 and a distant most longitudinal portion 17 of distal portion 15 is cut away to leave a semicircular or partially circular arc at distal end 14 of the housing 12 as seen in two different orthogonal views in FIGS. 1 and 2. In the illustrated embodiment, portion 17 is approximately 30 mm long and is approximately half cylindrical in shape. At the very distal tip 14 of the housing 12 two notches 16 are defined in the wall of housing 12 used to retain the distal end 20 of a probe 18 when the device 10 is not in use or is returned to its pre-measurement configuration.

The probe 18 is telescopically disposed in the housing 12 and is sufficiently long enough to extend from the distal tip 14 of the housing 12 to the proximal end of the device 10. The distal tip 20 of probe 18 has a J-shaped bend in it which is flattened into a square shape to allow for a larger gripping or contacting surface area. The lateral sides of the square shaped tip 20 align with two machined surfaces of surface 17 of the distal portion of the housing 12. The probe 18 is preferably made out of a 14 gauge metal alloy such as those used for bicycle spokes, however other materials may be used without departing from the original spirit and scope of the invention. Probe 18 preferably has some resiliency to allow for some side bending without breakage with return to its straight original configuration, while being substantially inelastic with respect to the forces that are normally applied to it so that its length can be treated as fixed or constant.

The proximal end 19 of probe 18 is threadably coupled to a threaded calibration nipple 26, which may be similar to a bicycle spoke nipple. The longitudinal body of probe 18 forms an axis on which the other components of the device 10 are disposed and around which they may rotate. As can be seen in the exploded view of FIG. 2, the calibration nipple 26 is telescopically disposed into a matching semiblind bore 27 defined in calibration barrel 24 which serves as a finger grip. Calibration nipple 26 can be rotated to adjust the distance between the distal end of calibration barrel 24 and distal end 20 of probe 18. The distal end of calibration barrel 24 bears against the proximal end of measuring barrel 22. The adjusted distance between the distal end of calibration barrel 24 and distal end 20 of probe 18 therefore provides a means whereby the zero or other initial reference point on the outside of measuring barrel 22 can be matched to the proximal end of housing 12. As will be discussed below, the illustrated embodiment uses a 4mm initial reference point. Once the desired calibration of measuring barrel 22 has been achieved by adjustment of calibration nipple 26, set screw 25 on calibration barrel 24 is tightened, probe 18's position in calibration barrel 24 is fixed and the distance between the distal end of calibration barrel 24 and distal end 20 of probe 18 fixed. With the probe 18 firmly coupled to the calibration barrel 24 set screw 25, the probe 18 and calibration barrel 24 can be moved longitudinal and/or rotated as a single unit with respect to housing 12. That is to say, when the user of device 10 rotates the calibration barrel 24 in either a clockwise or counterclockwise motion, the J-shaped distal end of probe 18 rotates accordingly. Conversely, when probe 18 is sliding either proximally or distally with respect to distal end 14, the calibration barrel 24 and measuring barrel 22 moves longitudinally accordingly as well. It is in this fashion that probe 18 is rotated in and out of notch 16 and measures the thickness of the brake pad lining when the device 10 is being used.

Figure 2:
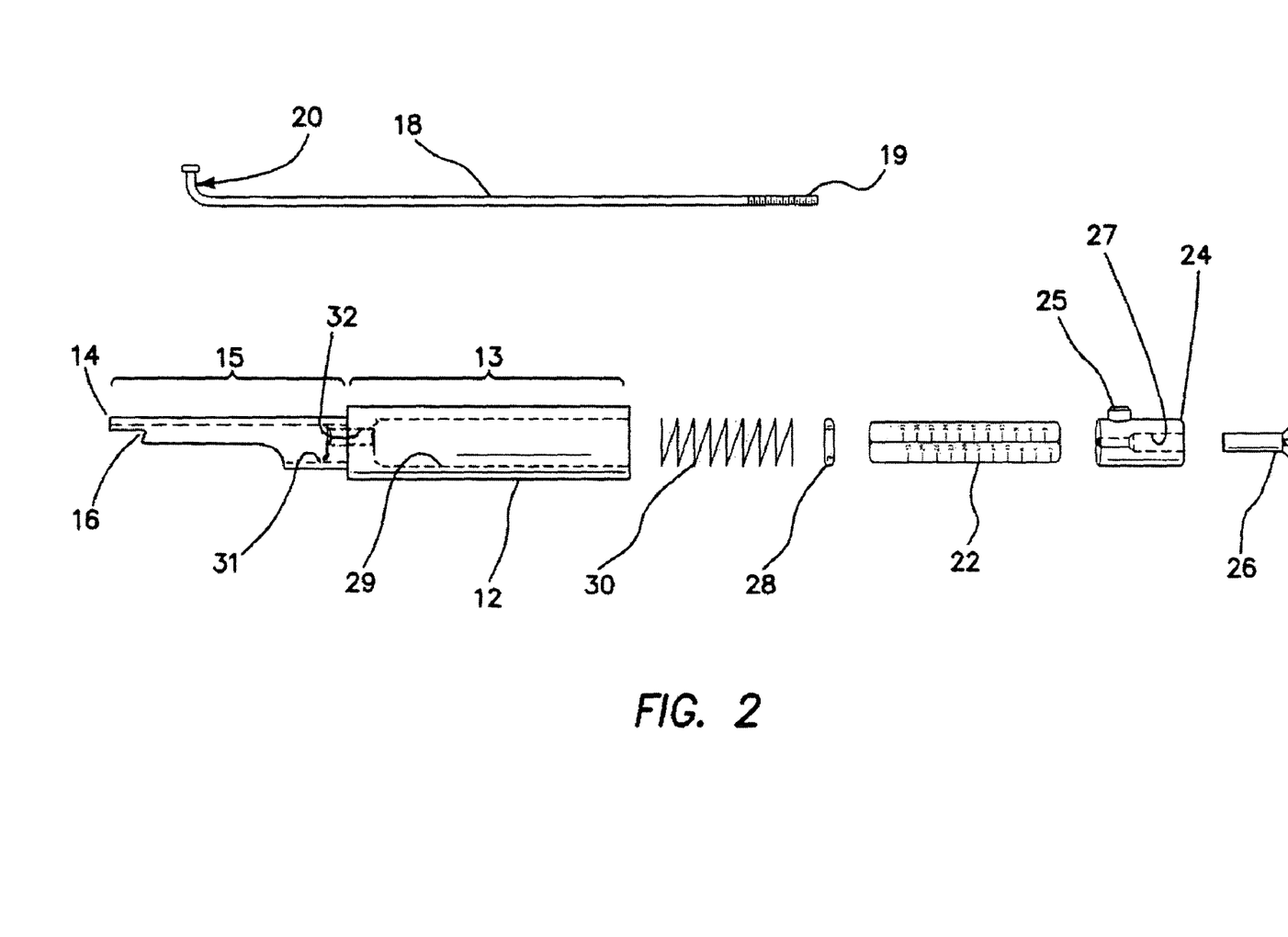
FIG. 2 is a side exploded view of the brake pad measuring device, showing the various component parts.

Also contained within housing 12 as illustrated in the exploded view of FIG. 2 are a steel washer 28, and a compression spring 30. The steel washer 28 is circular in shape and takes the form of a traditional washer. The diameter of the steel washer 28 is sufficiently small so that it is completely contained within the proximal portion 13 of the housing 12 of the device 10. The steel spacer 28 is not coupled to the housing 12 in any manner and is free to slide along the surface of the probe 18. The steel washer 28 rests in between compression spring 30 and measuring barrel 22. This allows for the smooth or easy rotation of barrel 22 and prevents spring 30 from marring the surface of the composite softer measuring barrel 22. The opposing end of spring 30 bears directly against the floor of bore 29 of proximal portion 13 of housing 12. The spring 30 is itself approximately 30 mm long in the illustrated embodiment when in its uncompressed state and is made out of a durable metal alloy so that its spring constant is maintained without fatigue. The spring 30 is not coupled to the housing 12 or the steel washer 28 and is free to slide freely inside of bore 29 or housing 12.

The final inner component of the device 10 is the measuring barrel 22. The measuring barrel 22 has preferably a hexagonal hollow shape so that the user may easily grip the barrel and rotate it in order to view the different scales or readings that are printed on the side of the measuring barrel 22. It is to be understood that measuring barrel 22 may be provided with a cylindrical shape on any other prismatic shape as might be desired. The measurement readings on the side of the measuring barrel 22 are given in both English and metric systems, namely 32nds of an inch and millimeters or any other gauge desired. Both measurement systems are set to read "0" at or near the proximal end of the measuring barrel 22 and increase down the barrel 22 longitudinally. The measuring barrel 22 is preferably made of a plastic composite however comparable materials may be used without departing from the original spirit and scope of the invention. Finally, the measuring barrel 22 is not coupled to the housing 12 or probe 18 in any way which leaves if free to rotate with respect o the probe 18 and slide proximally when forced in that direction by the spring 30, when J-tip 14 is released from notch 16. Barrel 22 may have a hexagonal, round, square, triangular or any other desired cross section. All these configurations could be utilized to allow smooth rotation in bore 29 of housing 12. The proximal end of measuring barrel 22 has a bore of approximately 2 mm to allow probe 18 to fit snugly and hold calibration barrel 24 to the same axis as measuring barrel 22. The distal end of measuring barrel 22 has a bore of approximately 4 mm. This allows the shaft of probe 18 to begin a slight bend to permit it to slide freely inside of offset bore 32 of portion 15 of housing 12.

Because the flat face of tip 20 of the probe 18 is 4 mm away from the distal end 14 of the housing 12 when tip 20 is at rest in notch 16, the device 10 is set or calibrated to read 4 mm on measuring barrel as the initial position. Should the measuring barrel 22 not read 4 mm when the probe 18 is still in notch 16 and not in its deployed state, the set screw 25 can be loosened and calibration nipple 26 can then be rotated either clockwise or counterclockwise which draws the probe 18 up or drives it down until the measuring barrel 22 reads exactly 4 mm. Set screw 25 can them be refastened.

Figure 4:
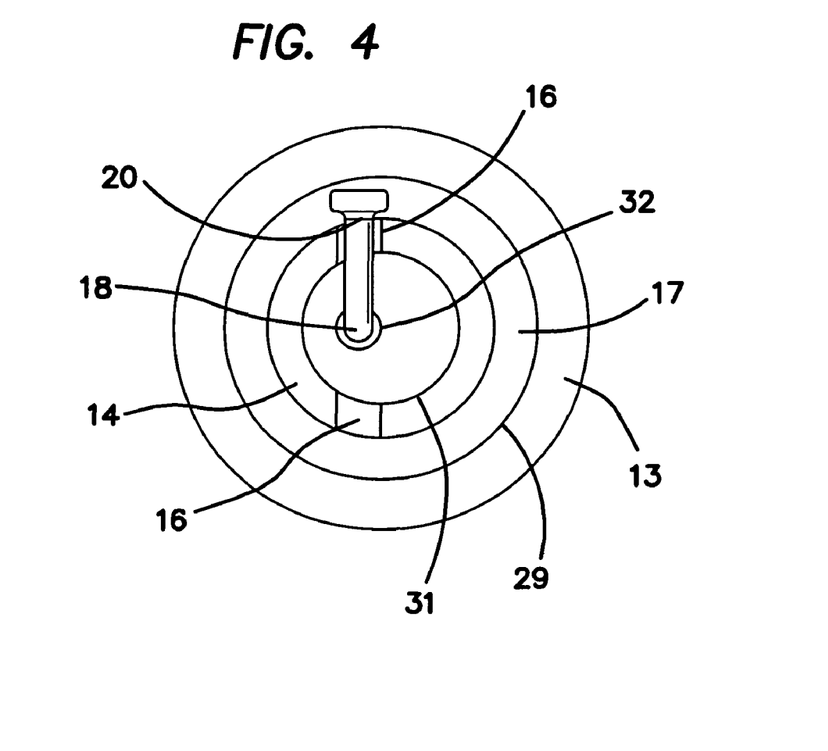
FIG. 4 is a distal end view of the brake pad measuring device seen in FIG. 1 showing the off-set position of the probe.

The probe 18 lies within the housing 12 at a position that is off-center of the device as can be best seen in the end cross sectional diagram of FIG. 4. FIG. 4 shows a distal end view in enlarged scale of the device. The pair of opposed notches 16 defined in the inner radial edges of distal tip 14 in one which notches 16 tip 20 rests is clearly seen as defined in the distal end 14 of the device. The cut-away surface 17 lies to the right of the notches 16 in the view of FIG. 4. Probe 18 extends from the off-center bore 32 defined in the floor of portion 13 of housing 12, which bore 32 in the illustrated embodiment touches with its inner edge on the centerline of symmetry of portion 13. However, this is not a necessary condition, but bore 32 could be positioned even more eccentrically off center to move tip 20 even more to the outer radial periphery of distal end 14 if desired. The distal surface of the floor of portion 13 of housing 13 is clearly depicted in the view of FIG. 4 as is the definition of bore 32 and the disposition of probe 18 through that floor. The probe 18 lies in an off-center position in order to allow sufficient room for the rotation of the extending lateral arm of probe 18 as it is being deployed and returned from the notch 16. The offset position is achieved by drilling bore 32 to a diameter of approximately 2.3 mm in portion 15 of housing 12. The bore 32 lies between the floor of bore 29 of housing 12 and the floor of bore 31 of portion 15 of housing 12. One end of the bore 32 coincides with the center line of housing 12, although this is not a necessary condition, and the opposite end of the bore 32 lies within the semicircular or arcuate area of portion 14 as best seen in FIG. 4. The 2.3 mm bore diameter of bore 32 allow the 2 mm shaft of probe 18 to rotate, extend and retract freely as it flexes to maintain its offset position in the distal portion of housing 12 as seen in FIG. 4.

Figure 3:
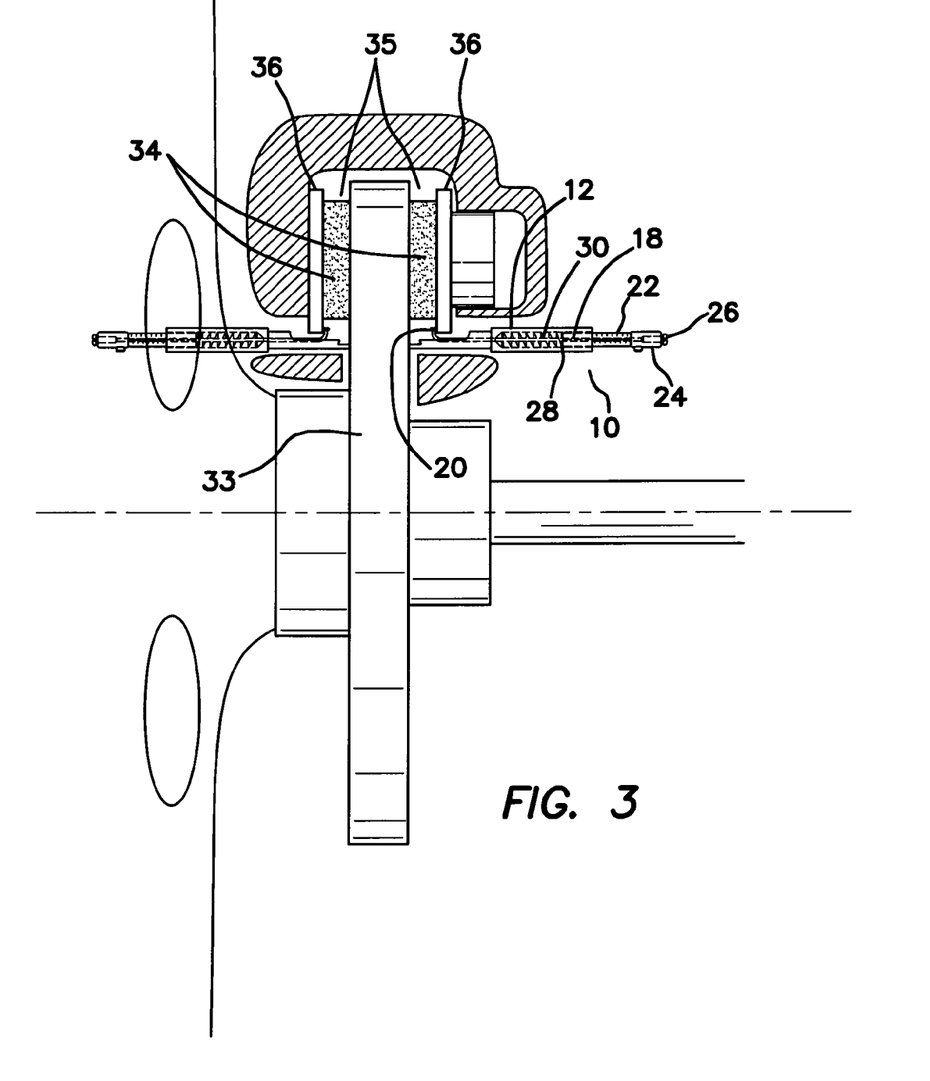
FIG. 3 is a side plan view of the housing of the device when its distal end is positioned between the rotor and backing plate of the disc brake of a vehicle.

The use and implementation of device 10 is best shown through FIG. 3. Once the user has successfully navigated the device 10 through suspension components for the primary inside pad measurement or through the opening in the wheel for a secondary outer pad measurement, the user pushes the distal tip 14 of the device 10 flat against a brake rotor 33 of the vehicle. The user then makes sure that the half cylindrical opening of portion 17 is facing a brake pad lining 34 that is to be measured as illustrated in FIG. 3. Once thusly positioned, the user manually rotates the calibration barrel 24 and thus the probe 18 until the J-shaped tip 20 of the probe 18 has cleared the inner wall of the notch 16. With the probe 18 free and clear of the notch 16, the spring 30 is free to expand and push the measuring barrel 22 in the proximal direction. The distal end of the spring 30 bears against the floor of bore 29 of housing 12 thus causing the spring 30 to only expand in the proximal direction against the washer 28 and measuring barrel 22. The measuring barrel 22 in turn then pushes against the calibration barrel 24 which is then forced in the proximal direction toward the user along with the probe 18 which coupled to it via the threaded calibration nipple 26. As the spring 30 continues to expand, the probe 18 continues to move proximally through the cut away portion 17, and the measuring barrel 22, calibration barrel 24, and the calibration nipple 26 all continue to move proximally.

The probe 18 continues to move away from the rotor 33 past the side of the brake pad lining 34 until it comes into contact with a brake pad backing plate 36. The flat face of tip 20 of the probe 18 contacts the edge of the backing plate 36 and all movement of the device 10 including the expansion of the spring 30 terminate immediately. Is in this fashion therefore that both the probe 18 and the measuring barrel 22 have moved the exact same longitudinal distance. That is to say, the distance that the tip 20 of probe 18 has traveled should be the last visible reading on the measuring barrel 22. For vehicles with disc brakes, the brake pad 34 essentially lies against the rotor 33 of the vehicle as shown in FIG. 3 or within a few thousands of an inch thereto. The distance that probe 18 has traveled between the rotor 33 and the backing plate 36 and its corresponding reading on measuring barrel 22 thus represents the approximate thickness of the vehicle's brake pad lining 34, certainly with a fraction of a mm.

Once the user has noted the measurement reading on the measurement barrel 22, the user then applies a distal force against the calibration barrel 24 of the device 10. This distal force pushes the calibration barrel 24 against the measuring barrel 22 which in turn compresses the spring 30. The calibration barrel 24 as well as the probe 18 is then driven distally to their original starting positions. The user may then release the pressure applied to the calibration barrel 24 to re-take the brake pad thickness measurement as many times as is necessary, or the user may rotate the calibration barrel 24 and thus the probe 18 back into the notch 16 and store the device 10 for transport or later use. In the preferred embodiment two notches 16 are provided on each side of the tip 14 so that the probe can be rotated in either direction into a receiving notch 16. The spring force provided by the spring 30 keeps the probe 18 in notch 16 and effectively "locks" it into place.

It may now also be appreciated that portion 17 includes the measuring feeler of the device 10 and that the thickness of portion 17 of housing 12 may be reduced as much as the strength of material may allow so that portion 17 can be disposed into extremely small and restricted openings that might be available in the wheel and brake assembly configurations of most vehicles available on the market, thus making device 10 a universal tool.

It can also be appreciated by viewing FIG. 3 that the distance or space 35 from the top of the brake pad 34 to the top of the brake pad backing plate 36 is variable in different makes of vehicles and in some cases may be quite small. However, the extent to which tip 20 of probe 18 needs to extend into this space 35 in order to successfully take a reliable and repeatable measurement is similarly variable and small, as may be variably controlled by the amount or rotation of J-tip 20 into the space defined by cut-away portion 17 of housing 12. In use, probe 18 is simply rotated out from notch 16 until it is felt to be stopped by the edge of pad 34, then calibration barrel 24 is released allowing J-tip 20 to snap back against backing plate 36 under the urging of spring 30. It can always thus be confidently assumed that when so used, J-tip 20 has been rotated by just the right amount to catch the maximum amount of backing plate 36 which is available as a measurement surface in every vehicle measured.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations; A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for measuring the thickness of a disc brake pad installed on a vehicle with suspension components without requiring removal of a corresponding wheel comprising:
    a housing having a distal end comprising a longitudinal cut-away portion, the distal end being sized and shaped to extend pass suspension components or through an opening defined through the corresponding wheel for positioning relative to a brake rotor disc corresponding to the disc brake pad;
    a probe telescopically disposed in the housing, the probe being arranged and configured to contact a backing plate corresponding to the brake pad;
    a calibration barrel coupled to the probe;
    a spring coupled to the probe for urging the probe proximally against the backing plate when taking a measurement of the thickness of a disc brake pad; and
    a measuring barrel coupled to the probe so that when a measurement is made the measuring barrel is moved a distance equal to proximal movement of the probe relative to the distal end of the housing.

2. The apparatus of claim 1 where the probe has a J-tip shaped distal end and where the distal, longitudinally cutaway portion of the housing allows disposition and movement of the J-tip shaped distal end of the probe into and through a space defined by the distal, longitudinally cut-away portion of the housing.

3. The apparatus of claim 2 where the distal end of the housing further comprises a notch in which the probe may be positioned in a premeasurement configuration.

4. The apparatus of claim 1 where the probe further comprises a J-shaped bend in the distal end of the probe.

5. The apparatus of claim 4 where the probe further comprises a flattened shaped tip to provide a gripping or contact surface area.

6. . The apparatus of claim 1 where the measuring barrel is provided with a plurality of measurement scales, is telescopically disposed in the housing and is hexagonal in shape for easy rotation for viewing the plurality of scales.

7. The apparatus of claim 1 where the measuring barrel is provided with a plurality of measurement scales, is telescopically disposed in the housing and is cylindrical in shape for easy rotation in the housing and for easy rotation for viewing the plurality of scales.

8. The apparatus of claim 1 where the calibration barrel further comprises a captured calibrating nipple threadably coupled to the probe for calibrating an initial configuration of the probe.

9. The apparatus of claim 1 where the probe telescopically and longitudinally extends through the housing and measuring barrel, where the measuring barrel is telescopically disposed in the housing, where the spring urges the measuring barrel with the probe proximally with respect to the housing.

10. The apparatus of claim 1 further comprising a releasable locking mechanism for retaining the probe in a distally extended configuration when in a premeasurement configuration, the probe automatically assuming a measuring configuration wherein the probe contacts the backing plate due to the spring when released by the locking mechanism so that the measuring barrel is moved a distance equal to proximal movement of the probe to contact the backing plate.

11. The apparatus of claim 1 where the probe has a radially extending tip, where the housing has a longitudinal center axis, and where the probe is positioned off-center in the distal end of the housing with respect to the longitudinal center axis so that the shape of the distal end of the housing may arranged and configured to reduce its size as compared to a configuration of the housing with the probe on-center, but without requiring reduction in the radial extent of the tip of the probe.

12. A method of measuring the thickness of a disc brake pad of a vehicle with suspension components without requiring removal of a corresponding wheel comprising:
   providing a distal end of a measuring apparatus, which distal end is sized and shaped to extend by the suspension components or through an opening defined through the corresponding wheel;
   placing the distal end of the apparatus against a corresponding brake rotor of a vehicle;
   releasing a probe from the distal end of the apparatus;
   moving the probe proximally until it comes into contact with a corresponding backing plate of the brake pad;
   moving a measuring barrel proximally approximately the same distance as the probe moved; and
   reading a distance measurement of the movement of the measuring barrel.

13. The method of claim 12 where releasing the probe further comprises rotating a proximal finger grip coupled to the probe to rotate the probe into a measurement configuration adapted to contact the corresponding backing plate.

14. The method of claim 12 where moving the probe proximally until it comes into contact with the corresponding backing plate of the brake pad comprises automatically moving the probe under a spring force upon release from the distal end of the apparatus.

15. The method of claim 14 where releasing the probe comprises rotating the probe out of a notch defined in the distal end of the apparatus.

16. The method of claim 12 where moving the probe proximally comprises moving the probe through a longitudinal cut-away opening in the distal end of the apparatus and positioning the backing plate into the longitudinal cut-away opening so that the probe contacts the backing plate as a first obstructing contact.

17. The method of claim 12 where moving the measuring barrel proximally out of the apparatus comprises automatically moving the measuring barrel with the probe by means of spring force upon release of the probe.

18. The method of claim 12 where the probe has a length and further comprising calibrating the measurement of movement of the probe by adjusting the length of the probe relative to the measuring barrel.

19. The method of claim 12 where reading a distance measurement off of the measuring barrel further comprises rotating the measuring barrel to view one of a plurality of measurement scales.

* * * * *